United States Patent
Park et al.

(10) Patent No.: US 11,860,300 B2
(45) Date of Patent: ***Jan. 2, 2024

(54) SYSTEM AND METHOD FOR VEHICLE RADAR INSPECTION

(71) Applicants: HYUNDAI MOTOR COMPANY, Seoul (KR); KIA CORPORATION, Seoul (KR)

(72) Inventors: Jihoon Park, Suwon-si (KR); David Oh, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 166 days.

This patent is subject to a terminal disclaimer.

(21) Appl. No.: 17/529,856

(22) Filed: Nov. 18, 2021

(65) Prior Publication Data

US 2022/0075024 A1    Mar. 10, 2022

Related U.S. Application Data

(62) Division of application No. 16/193,364, filed on Nov. 16, 2018, now Pat. No. 11,209,526.

(30) Foreign Application Priority Data

Jun. 25, 2018    (KR) .................... 10-2018-0072638

(51) Int. Cl.
*G01S 7/40*    (2006.01)
*H01Q 1/32*    (2006.01)
(Continued)

(52) U.S. Cl.
CPC .......... *G01S 7/4008* (2013.01); *G01S 13/931* (2013.01); *H01Q 1/3233* (2013.01); *H01Q 13/02* (2013.01);
(Continued)

(58) Field of Classification Search
CPC .......... G01S 13/931; G01S 2013/9316; G01S 2013/9327; G01S 2013/93272;
(Continued)

(56) References Cited

U.S. PATENT DOCUMENTS

2002/0105456 A1    8/2002    Isaji
2008/0007016 A1    1/2008    Hoenke et al.
(Continued)

FOREIGN PATENT DOCUMENTS

| JP | H11326495 A | 11/1999 |
| KR | 20140135410 A | 11/2014 |
| KR | 20150034349 A | 4/2015 |

*Primary Examiner* — Timothy X Pham
(74) *Attorney, Agent, or Firm* — Lempia Summerfield Katz LLC

(57) ABSTRACT

A vehicle radar inspection system and method are provided for inspecting a mounting state of a radar sensor mounted to a vehicle. The vehicle radar inspection system includes a centering portion that aligns a position of the vehicle by driving rollers, displacement sensors that are respectively disposed at front and rear sides of the centering portion, an array antenna that measures propagation intensity of a radar signal transmitted from the radar sensor, and a server that connects wireless communication with a wireless terminal of the vehicle, calculates a mounting position of the radar sensor, and detects a mounting error of the radar sensor with reference to a normal reference mounting specification.

9 Claims, 9 Drawing Sheets

(51) Int. Cl.
  *G01S 13/931*  (2020.01)
  *H01Q 13/02*  (2006.01)
(52) U.S. Cl.
  CPC .............. *G01S 2013/9316* (2020.01); *G01S 2013/9327* (2020.01)
(58) Field of Classification Search
  CPC ...... G01S 7/4008; G01S 7/4026; G01S 7/403; G01S 7/4034; G01S 7/4086; H01Q 1/3233; H01Q 1/3283; H01Q 13/02; H01Q 21/064; H01Q 3/02
  See application file for complete search history.

(56) References Cited

U.S. PATENT DOCUMENTS

| | | |
|---|---|---|
| 2013/0035783 A1 | 2/2013 | Scheuerman et al. |
| 2013/0239425 A1 | 9/2013 | Ham |
| 2016/0377701 A1 | 12/2016 | Kim et al. |
| 2016/0377702 A1 | 12/2016 | Yomo et al. |
| 2017/0212215 A1 | 7/2017 | Hellinger et al. |
| 2018/0299533 A1 | 10/2018 | Pliefke et al. |
| 2019/0056479 A1 | 2/2019 | Park et al. |
| 2019/0107602 A1 | 4/2019 | Kitamura |

- Prior Art -

SYSTEM AND METHOD FOR VEHICLE RADAR INSPECTION

CROSS-REFERENCE TO RELATED APPLICATION

This application is a divisional application of non-provisional U.S. patent application Ser. No. 16/193,364, filed on Nov. 16, 2018, which claims priority to and the benefit of Korean Patent Application No. 10-2018-0072638, filed on Jun. 25, 2018, the entire contents each of which are incorporated herein by reference.

FIELD

The present disclosure relates to a vehicle radar inspection system and method that verifies a radar position mounted on a vehicle.

BACKGROUND

The statements in this section merely provide background information related to the present disclosure and may not constitute prior art.

In general, a radar is mounted on a vehicle to monitor a front circumstance of the vehicle to thereby secure driving safety of a driver.

The radar is mounted on the vehicle as an integral element for implementation of an advanced driver assistance system (ADAS) such as a collision alert system of a vehicle, an automatic emergency brake (AEB), a smart cruise control (SCC), a lane departure warning (LDWS), and the like.

Further, in recent years, studies for autonomous vehicles have been actively carried out, and interest in utilization of radar has been increased.

FIG. 1 shows a front side of a vehicle to which a radar sensor is generally attached.

Referring to FIG. 1, a conventional radar transmits and receives a radar signal through a radar cover that is mounted in a bumper at a front side of the vehicle and formed in a grill. Here, the grill is used for passing an air for cooling an engine of the vehicle, and highly affects an exterior design of the vehicle.

Thus, recently, the size of the radar cover installed in the grill has been reduced in design to improve merchantability for vehicle exterior.

However, we have discovered that since the radar is mounted on a beam module of the front bumper and the radar cover is mounted on the grill, their assembly tolerances may occur, and a sensing error may occur because a corner portion of the small-sized radar cover may be sensed.

In addition, when an error occurs in mounting the radar, sensor precision is deteriorated, and it causes deterioration in quality of the ADAS. In a worst-case scenario, accordingly, the ADAS cannot be used and thus a warranty claim of the vehicle may be occurred.

The above information disclosed in this Background section is only for enhancement of understanding of the background of the present disclosure, and therefore it may contain information that does not form the prior art that is already known to a person of ordinary skill in the art.

SUMMARY

The present disclosure provides a vehicle radar inspection system and method that measures a radar center value by installing a plurality of array antennas at a predetermined distance from a radar sensor that is mounted to a vehicle and detects an error in the radar center value with respect to a predetermined normal mounting specification.

According to one aspect of the present disclosure, a vehicle radar inspection system that inspects a mounting state of a radar sensor mounted to a vehicle is provided. The vehicle radar inspection system includes a centering portion that aligns a position of the vehicle with a reference inspection position of the radar sensor by driving rollers, displacement sensors that are respectively disposed at front and rear sides of the centering portion to measure a height of a lower portion of the aligned vehicle, an array antenna that measures propagation intensity of a radar signal transmitted from the radar sensor through a plurality of antennas disposed at a front end of a robot and recognizes a spot where the strongest propagation intensity is measured as a radar power center value, and a server that connects wireless communication with a wireless terminal of the vehicle, calculates a mounting position of the radar sensor by using a trigonometric function that refers to a plurality of radar center values and a distance between a plurality of inspection locations that are parallel with the radar sensor and the radar sensor by moving the array antenna to the plurality of inspection locations, and detects a mounting error of the radar sensor with reference to a normal reference mounting specification.

The centering portion may determine an alignment state of the vehicle through a vision sensor that is provided above the vehicle, and may align the vehicle in line with the reference inspection position by moving the driving rollers forward and backward when the vehicle is misaligned.

The array antenna may include a vertical panel where a mounting portion that is combined with a front end of the robot is formed; horn antennas, each having an opening in the shape of a trunk tube, and arranged in a lattice format on a front side of the vertical panel, and an image sensor that is disposed at a front center of the vertical panel.

In addition, the array antenna may detect a mounting error angle value of the radar sensor by comparing the measured radar power center value with a referenced center value of a radar center specification.

The robot may recognize a center of a radar cover formed in a grill at the front portion of the vehicle through the image sensor, and may horizontally align the center of the radar cover and the center of the array antenna.

The server may generate a virtual vehicle body line by virtually connecting a plurality of height values of the vehicle measured by the displacement sensors, and may detect a vehicle body correction angle according to deviation of the virtual vehicle body line with reference to a horizontal plane.

The server may derive a final mounting error by reflecting the vehicle body correction angle to a mounting error of the radar sensor, and may adjust an angle of the radar sensor or controls a repair process when the final mounting error does not satisfy a reference mounting specification.

In addition, when the final mounting error of the radar sensor is included within a range that can be corrected by the radar sensor, the server may generate a radar sensor correction value and may transmit the radar sensor to correct the final mounting error.

When the final mounting error of the radar sensor is not included within the range that can be corrected by the radar sensor, the server may start the repair process.

According to a further aspect of the present disclosure, the server may include a communication unit that is connected with a wireless terminal of the vehicle through antennas and transmits a control signal for radar signal transmission of the radar sensor, an interface unit that receives a tilted angle of the vehicle through the vision sensor by connection communication with the centering portion and transmits a control signal for operation of the driving rollers, a robot controller that moves the array antenna to a primary inspection portion and a secondary inspection portion through posture control of the robot, a database that matches identification (ID) of the wireless terminal and vehicle identification information and stores a matched result and stores a reference mounting specification of a vehicle where the wireless terminal is loaded and a result of radar sensor inspection, and a controller that sets a reference mounting specification for error detection by modelling measurement information of a normally mounted radar sensor and inspects a normal position error and a normal error angle value by comparing measurement information of the radar sensor measured in an inspection line with the reference mounting specification.

In addition, the controller may compare a primary distance deviation b with respect to the reference mounting specification of the primary radar center value, measured at the primary detection position, and a secondary distance deviation b' with respect to the reference mounting specification of the secondary radar center value, measured at the secondary inspection position, and when the primary distance deviation b is smaller than the secondary distance deviation b', the controller determines that the radar sensor in a down-bent state, and when the primary distance deviation b is larger than the secondary distance deviation b', the controller determines that the radar sensor is in an up-lifted state.

According to one aspect of the present disclosure, a vehicle radar inspection method for a server provided in an inspection line to inspect a mounting state of a radar sensor mounted to a vehicle is provided. The vehicle radar inspection method includes steps of a) connecting communication with a wireless terminal connected to the vehicle and aligning the vehicle to a reference inspection position of the radar sensor through a centering portion provided in the inspection line, b) locating an array antenna disposed at a front end of a robot at a primary inspection position at a first distance from the radar sensor and measuring a primary radar center value by transmitting a primary radar signal, c) locating the array antenna at a secondary inspection position at a second distance from the radar sensor and measuring a secondary radar center by transmitting a secondary radar signal, and d) calculating a mounting position of the radar sensor by using a trigonometric function that refers to a plurality of radar center values and a distance between the plurality of inspection positions and the radar sensor.

The method a) may include determining an aligning position of the vehicle through a vision sensor provided above the vehicle while tires of the vehicle are mounted on driving rollers, and aligning the vehicle to be in line with the reference inspection position by operating the driving rollers forward and backward when the vehicle is misaligned.

The method b) and c) may include measuring propagation intensity of a radar signal transmitted from the radar sensor through horn antennas that are disposed in a lattice format, and recognize a spot where the strongest propagation intensity is measured as a radar power center value.

The method d) may include detecting a mounting error angle value of the radar sensor by comparing the radar power center value with a reference center value of a radar center specification.

The method d) further includes calculating a mounting position error by comparing the calculated mounting position of the radar sensor with a predetermined mounting specification.

The method a) further includes measuring a height of a lower part of the aligned vehicle through displacement censors that are disposed at front and rear sides of the centering portion, and forming a virtual vehicle body line by connecting heights of the lower port of the vehicle and detecting a vehicle body correction angle of the virtual vehicle body line with reference to a horizontal plane.

The vehicle radar inspection method may further include, after d), deriving a final mounting error by reflecting the vehicle body correction angle to a mounting error of the radar sensor and determining that the radar sensor is normally mounted when the final mounting error satisfies a reference mounting specification.

The method e) may include determining whether the final mounting error is included within a range that can be corrected by the radar sensor when the final mounting error does not satisfy the reference mounting specification, and generating a radar sensor correction value for correction of the final mounting error and transmitting the generated radar sensor correction value to the radar sensor when the final mounting error is included in the range.

The method e) further include entering the radar sensor into a repair process for re-mounting when the final mounting error does not satisfy the reference mounting specification and is not included in the range that can be corrected by the radar sensor.

According to the exemplary form of the present disclosure, the radar signal center value is measured through the array antenna that receives a radar signal at regular intervals, assembly tolerance can be detected by calculating errors of mounting position and an angle of the radar sensor, and a recognition error of the radar sensor can be corrected. Accordingly, the inspection system can reduce the cost of the warranty claims.

It is effective to measure the radar center value in the array antenna rather than to measure the signal reflected on a conventional radar correction target. In addition, it is effective to shorten transmission/reception distance of the radar signal and to simply inspect the mounting position of the radar sensor in a narrow space.

Further, the server in the inspection line automatically controls the radar sensor and peripheral devices of the vehicle such that there is an advantage of reducing the workload of the final inspection line.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 generally shows a front portion of a vehicle to which a radar sensor is mounted;

FIG. 2 schematically shows a configuration of a vehicle radar inspection system according to an exemplary form of the present disclosure;

Figure 5:
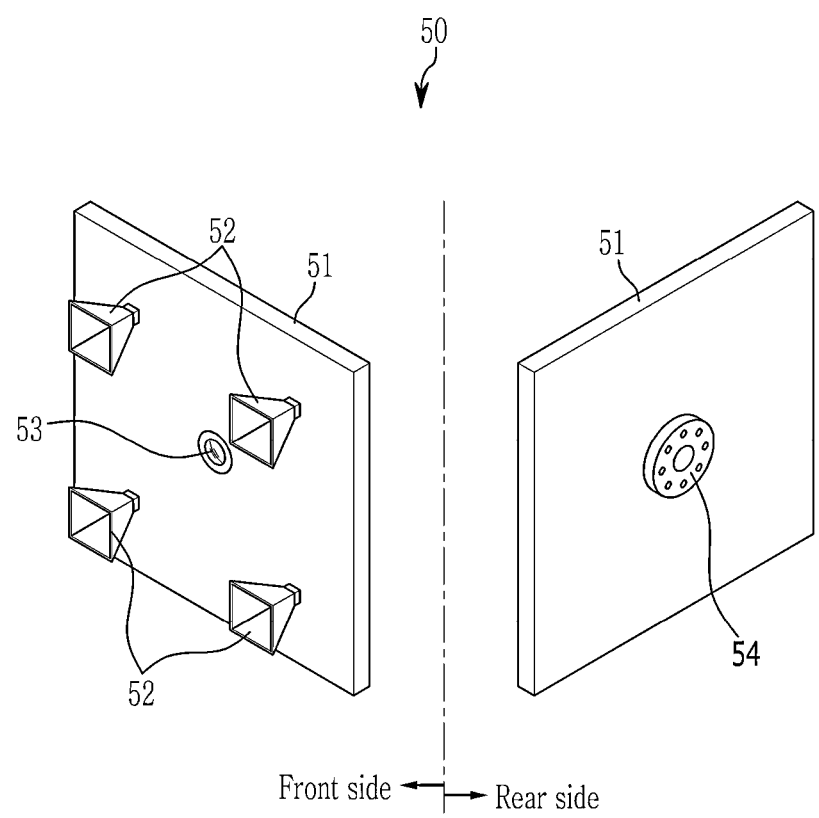
Figure 6:
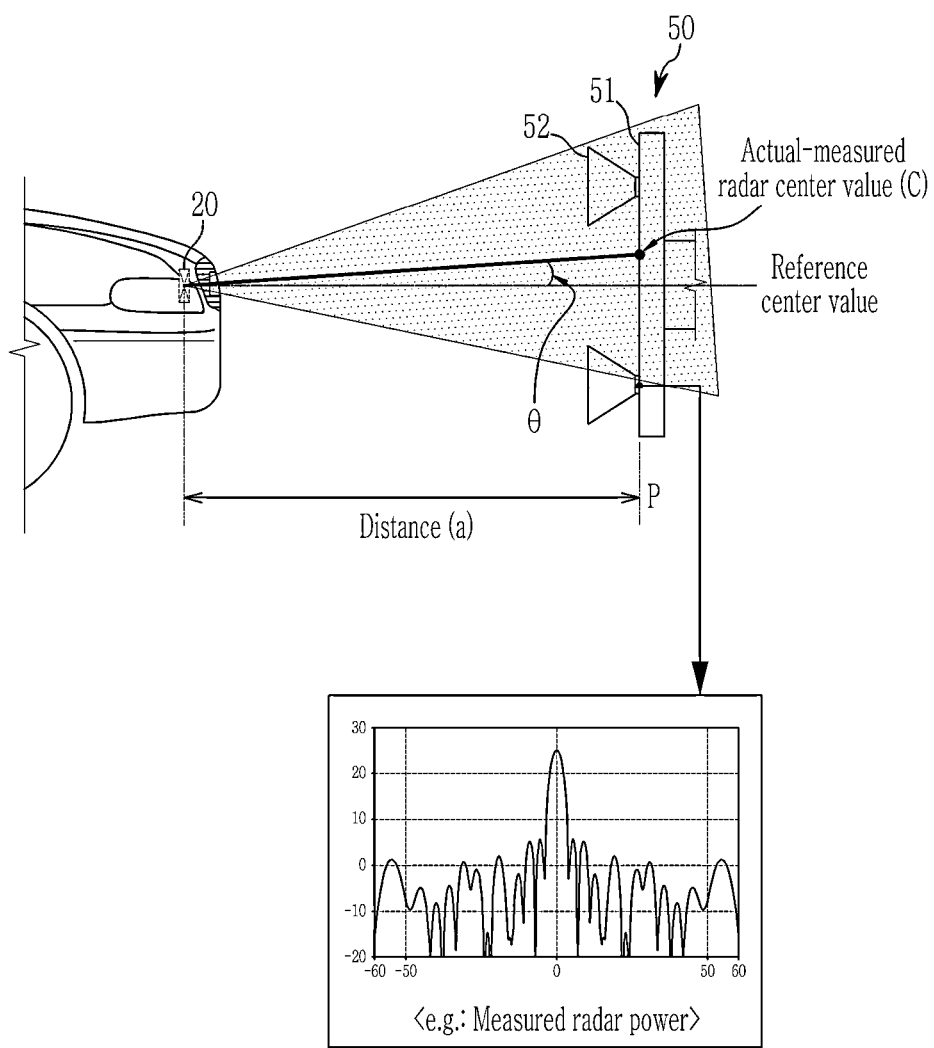
Figure 7:
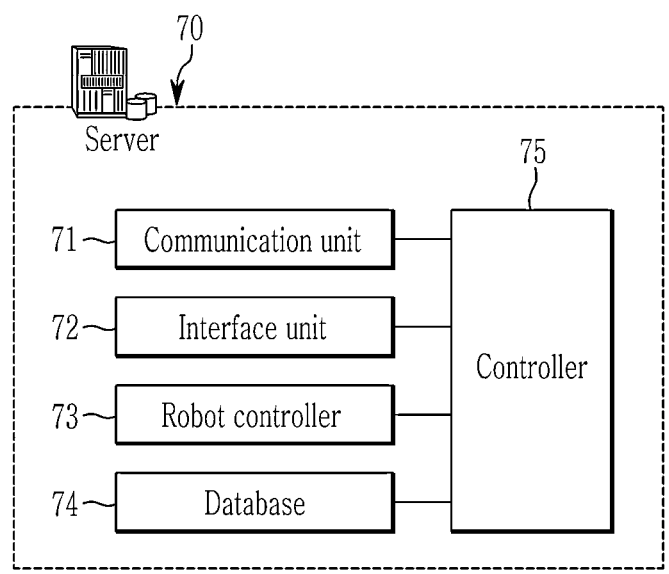
Figure 8:
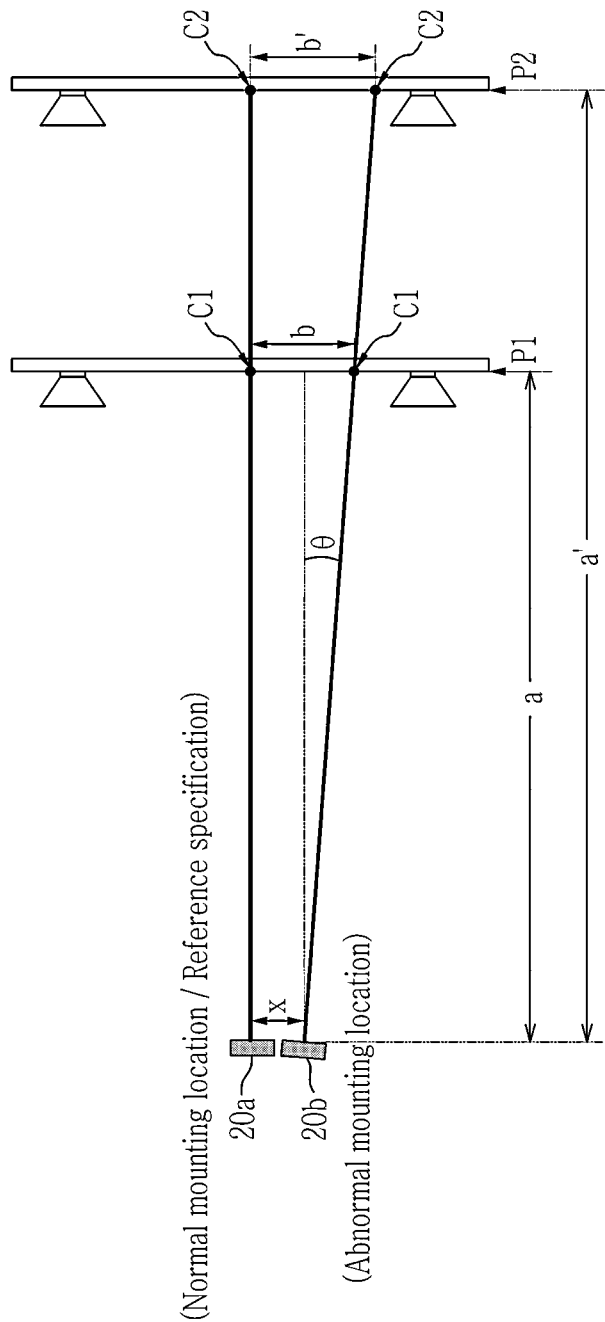
Figure 9:
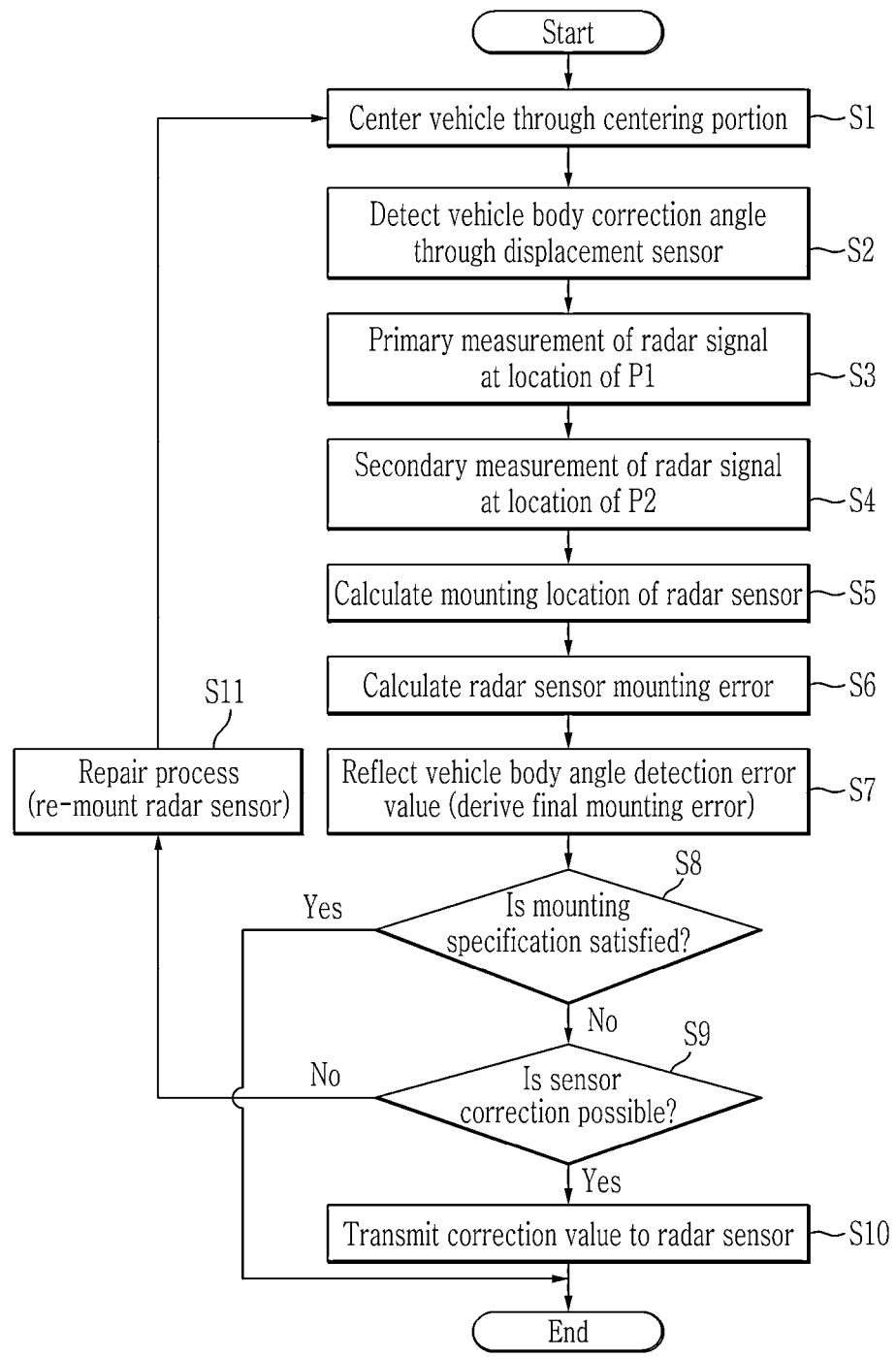

FIG. 5 schematically shows a configuration of an array antenna according to the exemplary form of the present disclosure;

FIG. 6 shows a radar center measuring method by using the array antenna according to the exemplary form of the present disclosure;

FIG. 7 is a schematic block diagram of a configuration of a server according to the exemplary form of the present disclosure;

FIG. 8 shows a method for calculating a mounting position and an angle of the radar sensor according to the exemplary form of the present disclosure; and FIG. 9 is a schematic flowchart of a vehicle radar inspection method according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Figure 1:
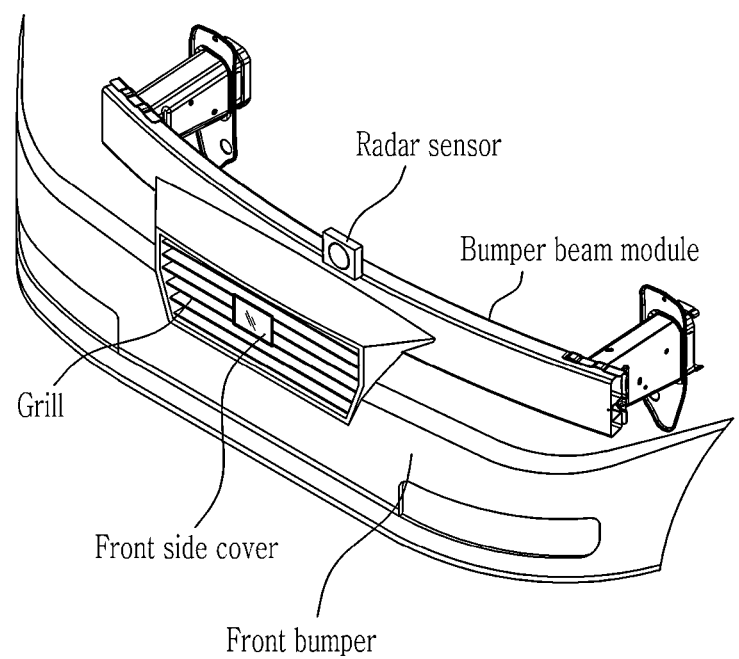
Figure 2:
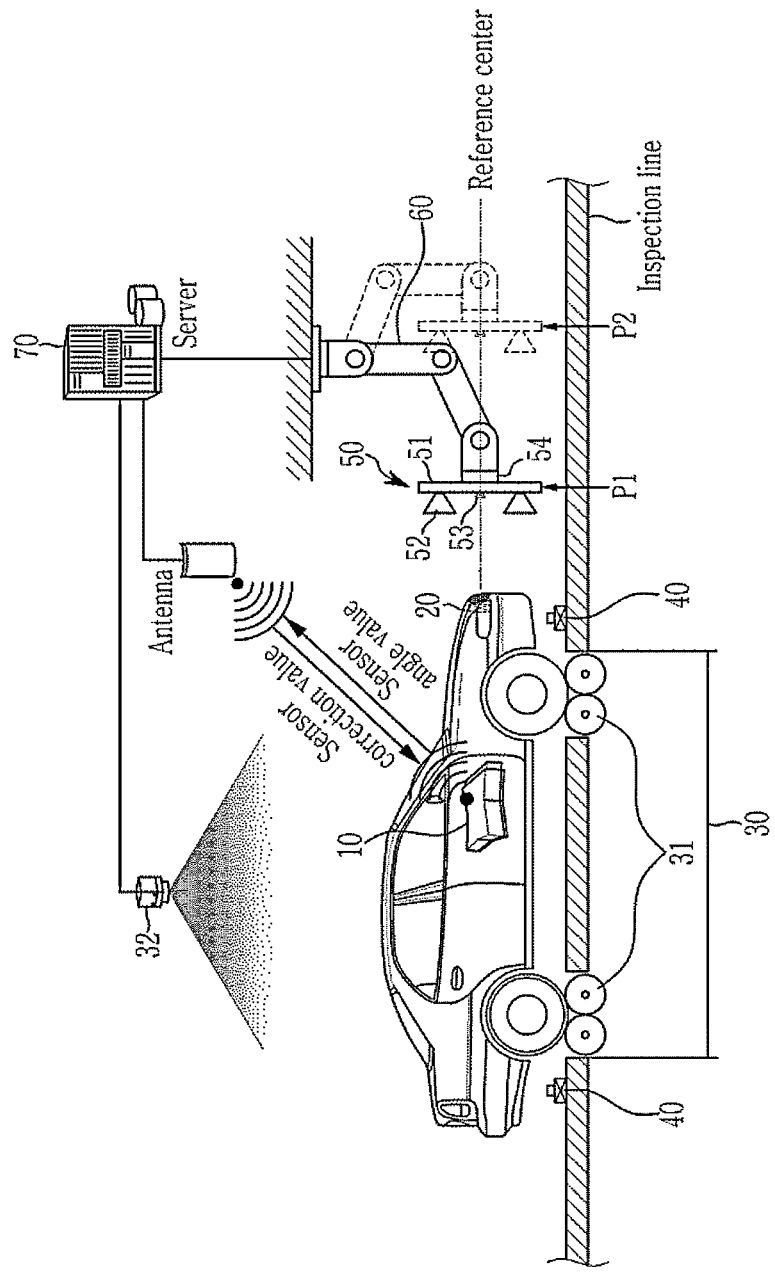

FIG. 2 schematically shows a configuration of a vehicle radar inspection system according to an exemplary form of the present disclosure.

Referring to FIG. 2, the vehicle radar inspection system according to an exemplary form of the present disclosure includes a wireless terminal 10 mounted in a vehicle, a radar sensor 20, a centering portion 30 provided in a vehicle inspection line, a displacement sensor 40, an array antenna 50, a robot 60, and a server 70.

The wireless terminal 10 is mounted in a vehicle that moves along an inspection line, and matches a unique identification (ID) and vehicle identification information of each vehicle.

The radar sensor 20 is installed inside a front bumper of the vehicle, and is connected with a vehicle electronic control unit (ECU, not shown) through a communication line.

The wireless terminal 10 is connected to a communication line in the vehicle through a connector and thus directly communicates with the radar sensor 20 or indirectly communicates with the radar sensor 20 through the vehicle ECU.

The wireless terminal 10 may be provided as an on-board diagnostics (OBD) system, and receives a control signal (On/Off) for test radar signal transmission from the server 70 through antennas and transmits the received control signal to the radar sensor 20.

In addition, when a mounting error of the radar sensor 20 occurs, the wireless terminal 10 receives a sensor correction value from the server 70 and transmits the received value to the radar sensor 20, and transmits a corrected sensor angle value of the radar sensor 20 to the server 70.

The radar sensor 20 includes a transmitting unit that transmits a radar signal forward, a receiving unit that receives a reflected radar signal, and a control module (MCU) that measures a distance to a frontal object, a speed and an angle by analyzing the reflected radar signal.

The radar sensor 20 may set an angle value of a sensor to which the radar signal is transmitted, and adjusts a sensor angle according to the sensor correction value received from the server 70 on its own. For example, the sensor angle adjustment can be carried out by software that sets an offset according to the sensor correction value. However, the exemplary form of the present disclosure is not limited thereto, and the sensor angle can be mechanically adjusted by using a device that minutely adjusts an angle of each of the transmitting unit and the receiving unit.

The centering portion 30 aligns a location of the vehicle according to a referenced inspection position of the radar sensor 20 by using a driving roller 31.

The centering portion 30 determines an alignment state of the vehicle through a vision sensor 32 provided at an upper side of the vehicle when tires of the vehicle are located on the driving roller 31, and aligns the vehicle to the referenced inspection position by moving the driving roller 31 forward or backward when the vehicle is tilted left or right.

Figure 3:
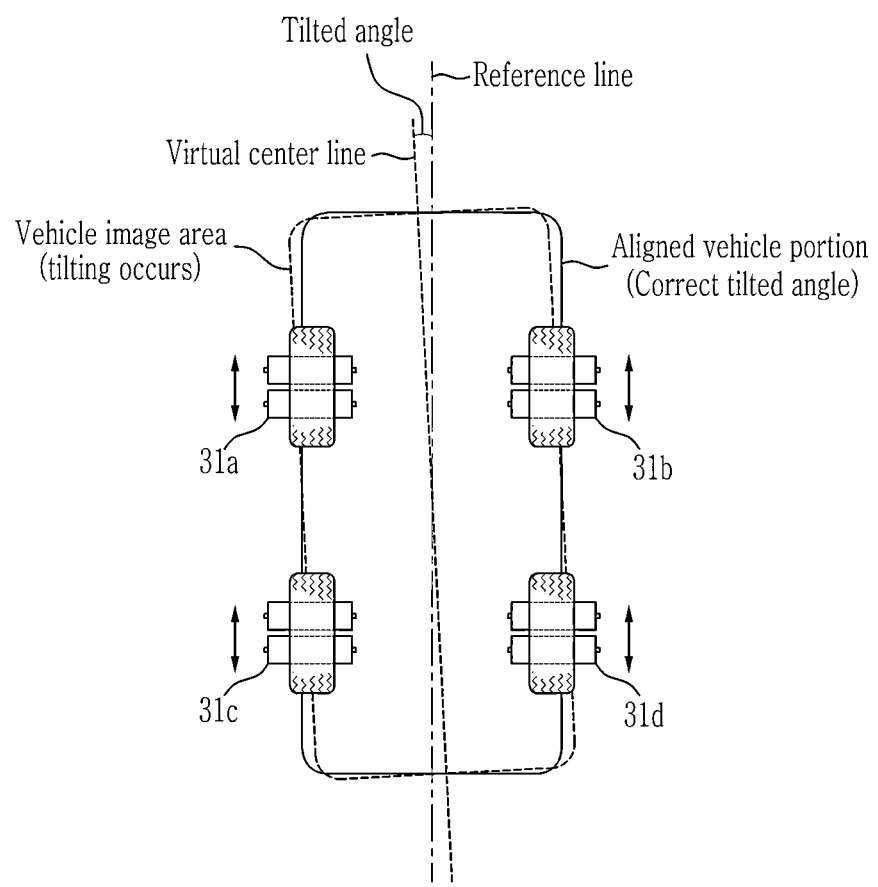
FIG. 3 shows a vehicle centering method according to the exemplary form of the present disclosure.

For example, FIG. 3 shows a vehicle centering method according to the exemplary form of the present disclosure.

Referring to FIG. 3, the centering portion 30 extracts a virtual center line from a vehicle image area photographed through the vision sensor 32, and calculates a tilted angle of the vehicle by comparing the extracted center line with the referenced inspection position. In addition, at least one of driving rollers 31a to 31d that correspond to the four wheels of the vehicle is driven in a forward or backward direction to match the center line to a reference line, thereby correcting the tilted angle of the vehicle. In typical vehicle centering, two rollers on which the tires are located may be disposed in units of the front wheels and the rear wheels, but four rollers may be disposed in the centering portion 30 to adjust the tilted angle.

Meanwhile, as previously described, a condition that the vehicle is horizontally aligned to the correct position must be assumed to reliably determine the mounting state of the radar sensor 20. However, vehicles assembled at a factory may have a slight error in assembling various parts. For example, horizontal alignment of the same height may be difficult because bending or lifting of the vehicle occurs due to various reasons such as the size of the wheel, optional parts such as tires (including air pressure), weight of the vehicle body, leaning, and the like.

Thus, as shown in FIG. 2, the displacement sensor 40 according to the exemplary form of the present disclosure is provided in each of the front side and the rear side of the centering portion 30 to measure the height of the bottom of the aligned vehicle body and transmit the measured height to the server 70.

Figure 4:
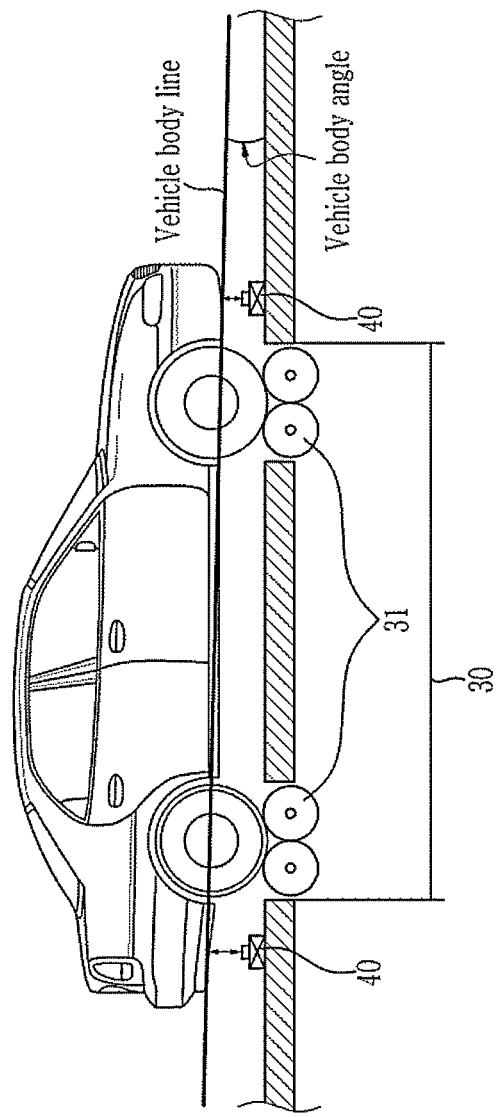
FIG. 4 shows a method for measuring a height and an angle of a vehicle by using a displacement sensor according to the exemplary form of the present disclosure.

FIG. 4 shows a method for measuring a height and an angle of the vehicle by using the displacement sensor according to the exemplary form of the present disclosure.

Referring to FIG. 4, the displacement sensors 40 according to the exemplary form of the present disclosure measure the height of the bottom of the vehicle according to a receiving time of a signal reflected after transmitting one of ultrasonic waves, laser, and infrared rays. In this case, the bottom height of the vehicle may be measured at a plurality of locations from a front side of the vehicle to a rear side of the vehicle.

Based on this, the server 70 virtually connects the plurality of height values of the vehicle, measured by the displacement sensors 40, and generates a virtual vehicle body line. In addition, based on the floor, which is a horizontal plane, a bending angle or a lifted angle (hereinafter referred to as a vehicle correction angle) of the vehicle due to deviation of the virtual vehicle body line can be detected.

The array antenna 50 measures propagation intensity of the radar signal transmitted from the radar sensor 20 through a plurality of antennas that are disposed at a front end of the robot 60, and recognizes a spot where a radar signal having the strongest propagation intensity as a radar power center spot.

FIG. 5 schematically shows a configuration of the array antenna 50 according to the exemplary form of the present disclosure.

Referring to FIG. 5, the array antenna 50 includes a vertical panel 51, horn antennas 52 disposed in plural at a front side of the vertical panel 51, an image sensor 53 disposed at a front center of the vertical panel 51, and a mounting portion 54 that is provided at a rear side of the vertical panel 51 and combined with the front end of the robot 60.

Each of the horn antennas 52 has an opening in the shape of a trunk tube, and may be arranged in a lattice format, which includes a plurality of columns and rows. In FIG. 5, for convenience of description, two horn antennas 52 are mounted in columns and rows in the vertical panel 51, but the number of horn antennas 52 is not limited thereto.

The horn antennas 52 that are disposed in the plurality of columns may be used to detect a mounting error interval and a mounting error angle in the vertical direction of the radar sensor 20. In addition, the horn antennas 52 that are disposed in the plurality of rows may be used to detect a mounting error interval and a mounting error angle in the horizontal direction of the radar sensor 20.

FIG. 6 shows a radar center measuring method by using the array antenna 50 according to the exemplary form of the present disclosure.

Referring to FIG. 6, the array antenna 50 where two or more horn antennas 52 are vertically disposed is located at an inspection position P, which is away by a predetermined distance a from the radar sensor 20, and the radar signal is transmitted to detect an actually-measured radar power center value C.

The array antenna 50 measures power of electromagnetic waves transmitted from the radar sensor 20 for each horn antenna 52 and then collected to measure a radar power center value C at a location where the strongest power is measured. In this case, the measured radar power center value C is compared with a reference center value of a radar center specification to detect a mounting error angle value $\theta$ of the radar sensor 20. Here, the mounting error angle value $\theta$ implies an error, which is a deviation with respect to the center specification, and at the same time has a meaning as a correction value for matching the radar power center value C with the reference center value.

Unlike a conventional radar measurement inspection in which a value reflected by a radar correction target at a distance in the front of the vehicle is determined to correct an angle of a radar sensor, the radar inspection method according to the exemplary form of the present disclosure derives a correction angle by using a value received at the array antenna 50.

Such an array antenna 50 can carry out inspection at an inspection position P that is within 1 m of the radar sensor 20. Thus, it has an advantage that the inspection space can be reduced compared to the conventional radar measurement inspection method.

In addition, an electromagnetic wave absorber that is provided in the radar correction target can be omitted, and thus installation cost can be saved, and even when the array antenna 50 is moved for radar signal transmission, the radar power center can be measured in real time.

Referring back to FIG. 2, the robot 60 is provided as a multi-joint manipulator that is capable of kinematic posture control, and the array antenna 50 is mounted at the front end thereof.

The robot 60 can move the array antenna 50 to a primary inspection position P1 that is disposed at a first distance a from the radar sensor 20 and a secondary inspection position P2 that is disposed at a second distance a' from the radar sensor 20 according to an applied posture control signal.

In this case, the robot 60 recognizes a center of the radar cover formed in the grill in the front portion of the vehicle through the image sensor 53 that is disposed at a center of the front side of the vertical panel 51, and horizontally aligns the center of the cover and a center of the array antenna 50. That is, when the mounting state of the radar sensor 20 is inspected, the array antenna 50 can be moved to the primary inspection portion P1 and the secondary inspection portion P2 while being horizontally aligned with the center of the radar cover by the robot 60.

The server 70 is provided as computer equipment that controls the entire operation of each element in the system for vehicle radar inspection according to the exemplary form of the present disclosure.

FIG. 7 is a schematic block diagram of the server according to the exemplary form of the present disclosure.

Referring to FIG. 7, the server 70 according to the exemplary form of the present disclosure includes a communication unit 71, an interface unit 72, a robot controller 73, a database 74, and a controller 75.

The communication unit 71 is connected with the wireless terminal 10 of the vehicle through antennas, and transmits a control signal (On/Off) for radar signal transmission of the radar sensor 20.

In addition, the communication unit 71 generates a sensor correction value when a mounting error of the radar sensor 20 occurs and transmits the generated sensor correction value to the radar sensor 20, and receives a response of completion of sensor correction.

The interface unit 72 connects the server 70 and peripheral devices provided in a vehicle radar inspection process for interworking therebetween.

The interface unit 72 connects communication with the centering portion 30 to determine a tilted angle of the vehicle, by the server 70 through the vision sensor 32, and supports control of the vehicle centering by operation of the driving rollers 31.

In addition, the interface unit 72 connects communication with the displacement sensors 40 to receive a correction angle of the vehicle body according to a bending or lifting state of the centered vehicle. Such a vehicle body correction angle can be used in correction of a radar mounting error, which will be calculated later.

The robot controller 73 stores kinematic information for posture control of the robot 60, and locates the array antenna 50 at the primary inspection position P1 and the secondary inspection position P2 through posture control of the robot 60.

The robot controller 73 recognizes a radar cover center of the centered vehicle through the image sensor 53, and aligns the center of the array antenna 50 with reference to the center of the cover through the posture control of the robot 60.

The robot controller 73 controls the posture of the robot 60 during a primary radar measurement to locate the array antenna 50 on the primary inspection position P1, and moves the array antenna 50 horizontally during a secondary radar measurement to locate the array antenna 50 on the secondary inspection position P2.

The database 74 stores various data and programs for inspection of the radar sensor 20, and stores data generated from the inspection of a radar sensor 20 for each vehicle.

For example, the database 74 stores a radar sensor mounting position in design drawings for different vehicles, and stores centering information for different vehicles, reference mounting specification information for different vehicles, primary and secondary inspection portion setting information, and the like. In addition, the database 74 matches an ID and vehicle identification information of the wireless terminal 10 and stores the result, and stores a result of radar sensor inspection of a vehicle where the wireless terminal 10 is loaded.

The controller 75 is a central processing unit that controls the entire operation of each element for the vehicle radar sensor inspection according to the exemplary form of the present disclosure. That is, a configuration of each part may be hardware, software, or a combination of hardware and software, and each function and role thereof may be operated or interworked with the control of the controller 75.

FIG. 8 shows a method for calculating a mounting position and an angle of the radar sensor according to the exemplary form of the present disclosure.

Referring to FIG. 8, radar measurement values of a reference radar sensor 20a normally mounted at a reference mounting position of the vehicle and an actual radar sensor 20b at an actual mounting position are compared.

The controller 75 sets a reference mounting specification for error detection by modelling measurement information of the reference radar sensor 20a that is normally mounted to the vehicle, and compares the measurement information of the reference radar sensor 20a with measurement information of the actual radar sensor 20b, actually measured in the inspection line, to detect a mounting position error value x and a mounting error angle value θ.

When inspection is started, the controller 75 sequentially locates an array antenna 50 of the actual radar sensor 20b on the primary inspection position P1 and the secondary inspection position P2, and measures a primary radar center value C1 and a secondary radar center value C2.

Here, a denotes a distance (hereinafter referred to as a first distance) between the radar sensors 20a and 20b and the primary inspection portion P1, a' denotes a second distance between the radar sensors 20a and 20b and the secondary inspection position P2, b denotes a distance deviation (hereinafter referred to as a primary distance deviation) with respect to the mounting specification corresponding to the primary radar center value C1 measured at the primary inspection position P1, b' denotes a distance deviation (hereinafter referred to as a secondary distance deviation) with respect to the mounting specification corresponding to the secondary radar center value C2 measured at the secondary inspection portion P2, x denotes a mounting error height value x of the actual radar sensor 20b with respect to a normal mounting position of the reference radar sensor 20a, and θ denotes a tilted mounting error angle value θ of the actual radar sensor 20b.

The controller 75 measures the primary radar center value C1 and the secondary radar center value C2 of the actual radar sensor 20b, and calculates a mounting position of the actual radar sensor 20b by using a trigonometric function that refers to the first distance a and the second distance a'.

In addition, the controller 75 compares a radar center value of the actual radar sensor 20b and a horizontal center line from the mounting position of the actual radar sensor 20b, and detects the mounting error angle value θ of the actual radar sensor 20b.

In this case, the controller 75 can calculate the mounting error angle value θ and the mounting error height value x in a state that the actual radar sensor 20b is bent downward (b<b') or in a state that the actual radar sensor 20b is bent upward (b>b').

For example, as shown in FIG. 8, the controller 75 can calculate a mounting error height value x through Equation 1 when the actual radar sensor 20b is bent downward (b<b').

$$\theta = \arctan\left(\frac{|b' - b|}{|a' - a|}\right)$$ (Equation 1)

$$x = b' - a'\tan\theta$$

In addition, the controller 75 can calculate a mounting error height value x through Equation 2 when the actual radar sensor 20b is bent upward (b>b').

$$\theta = \arctan\left(\frac{|b' - b|}{|a' - a|}\right)$$ (Equation 2)

$$x = b' + a'\tan\theta$$

In the above description that refers to FIG. 8, a method for calculating errors by measuring vertical mounting positions and angles of the radar sensor 20 has been described, but errors in horizontal mounting positions and angles of the radar sensor 20 can be measured by using the same method.

Meanwhile, the controller 75 can derive a final mounting error by reflecting a vehicle body correction angle detected by the displacement sensors 40 to at least one of the mounting position error height value x and the mounting error angle value θ.

In addition, the controller 75 determines successful inspection when the final mounting error satisfies a predetermined mounting specification, but if it is not satisfied, a re-mounting process is carried out through angle adjustment of the radar sensor 20 or a repair process.

Meanwhile, referring to FIG. 9, a vehicle inspection method according to the exemplary form of the present disclosure will be described based on the above-described configuration of the vehicle radar inspection system.

However, the above-described constituent elements of the server 70 can be integrated or further subdivided, and thus not the corresponding constituent elements but the server 70 will be mainly described in each stage in description of the vehicle radar inspection method according to the exemplary form of the present disclosure.

FIG. 9 is a schematic flowchart of the vehicle radar inspection method according to the exemplary form of the present disclosure.

Referring to FIG. 9, the server 70 according to the exemplary form of the present disclosure connects communication with a wireless terminal 10 of a vehicle that enters the inspection line, and aligns the vehicle at the reference inspection position of the radar sensor through the centering portion 30 (S1). In this case, the server 70 determines an alignment state of the vehicle through the vision sensor 32 disposed above the vehicle while tires of the vehicle are mounted on the driving rollers 31. In addition, when the vehicle is misaligned left/right, the driving rollers 31 operate forward or backward to align the vehicle in line with the reference inspection position.

The server 70 measures a height of a lower portion of the vehicle at a plurality of spots through the displacement sensors 40 to generate a virtual vehicle body line, and detects a vehicle body correction angle with reference to a horizontal plane (S2).

The server 70 locates the array antenna 50 at the primary inspection position P1 at the first distance a from the radar sensor 20 of the vehicle by posture control of the robot 60, and transmits a radar signal to measure a primary radar center value C1 (S3). In this case, the server 70 transmits a control signal for radar signal transmission through the wireless terminal 10 of the vehicle to operate the radar sensor 20.

The server 70 locates the array antenna 50 at the secondary inspection portion P2 at the second distance a' from the radar sensor 20 of the vehicle, and transmits a radar signal to measure a secondary radar center value C2 (S4).

The server 70 calculates a mounting position of the radar sensor 20 by using a trigonometric function that refers to at least one of the primary radar center value C1, the secondary radar center value C2, the first distance a, and the second distance a' (S5).

The server 70 calculates a mounting position error value x and a mounting error angle value $\theta$ by comparing the calculated mounting position of the radar sensor with a mounting specification (S6).

The server 70 derives a final mounting error by reflecting a correction value according to the vehicle body correction angle detected by the displacement sensors 40 to at least one of the mounting position error height value x and the mounting error angle value $\theta$ (S7).

The server 70 determines that the radar sensor 20 is normally mounted when the final mounting error satisfies the predetermined mounting specification (S8; Yes), and terminates the inspection process.

On the other hand, in S8, when the final mounting error does not satisfy the predetermined mounting specification (S8; No), the server 70 determines whether the final mounting error is within a range that can be corrected by the radar sensor 20 (S9).

In this case, when the final mounting error is within the range that can be corrected by the radar sensor 20 (S9; Yes), the server 70 generates a radar sensor correction value for correcting the final mounting error and transmits the generated radar sensor correction value to the radar sensor 20 through the wireless terminal 10 (S10).

On the other hand, in S9, when the final mounting error is not included within the range that can be corrected by the radar sensor 20 (S9; No), a repair process starts and thus a bumper is separated and then the radar sensor 20 is re-mounted (S12).

As described above, according to the exemplary form of the present disclosure, the radar signal center value is measured through the array antenna that receives a radar signal at regular intervals, assembly tolerance can be detected by calculating errors of mounting position and an angle of the radar sensor, and a recognition error of the radar sensor can be corrected. Accordingly, the inspection system can reduce the cost of warranty claims.

In addition, it is effective to measure the radar center value in the array antenna rather than to measure the signal reflected on a conventional radar correction target. In addition, it is effective to shorten transmission/reception distance of the radar signal and to simply inspect the mounting position of the radar sensor in a narrow space.

Further, the server in the inspection line automatically controls the radar sensor and peripheral devices of the vehicle such that there is an advantage of reducing the workload of the final inspection line.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS 10 wireless terminal
20: radar sensor
30 centering portion
40: displacement sensor
50 array antenna
51: vertical panel
52: horn antenna
53: image sensor
54: mounting portion
60: robot
70 server
71: communication unit
72: interface unit
73: robot controller
74: database
75: controller

What is claimed is:

1. A vehicle radar inspection method for a server provided in an inspection line to inspect a mounting state of a radar sensor mounted to a vehicle, the vehicle radar inspection method comprising steps of:
   a) connecting, by the server, communication with a wireless terminal connected to the vehicle, and aligning the vehicle to a reference inspection position of the radar sensor through a centering portion provided in the inspection line;
   b) locating, by the server, an array antenna disposed at a front end of a robot at a primary inspection position at a first distance from the radar sensor, and measuring a primary radar center value by transmitting a primary radar signal;
   c) locating, by the server, the array antenna at a secondary inspection position at a second distance from the radar sensor, and measuring a secondary radar center by transmitting a secondary radar signal; and
   d) calculating, by the server, a mounting position of the radar sensor by using a trigonometric function that refers to a plurality of radar center values and a distance between the plurality of inspection positions and the radar sensor.

2. The vehicle radar inspection method of claim 1, wherein a) comprises:

determining an aligning position of the vehicle through a vision sensor provided above the vehicle while tires of the vehicle are mounted on driving rollers; and aligning the vehicle to be in line with the reference inspection position by operating the driving rollers forward and backward when the vehicle is misaligned.

3. The vehicle radar inspection method of claim 1, wherein b) and c) comprise measuring propagation intensity of a radar signal transmitted from the radar sensor through horn antennas that are disposed in a lattice format, and recognize a spot where the strongest propagation intensity is measured as a radar power center value.

4. The vehicle radar inspection method of claim 1, wherein d) comprises detecting a mounting error angle value of the radar sensor by comparing a radar power center value with a reference center value.

5. The vehicle radar inspection method of claim 1, wherein d) comprises calculating a mounting position error by comparing the calculated mounting position of the radar sensor with a reference mounting position.

6. The vehicle radar inspection method of claim 1, wherein a) comprises:

measuring a height of a lower part of the aligned vehicle through displacement censors that are disposed at front and rear sides of the centering portion; and forming a virtual vehicle body line by connecting heights of the lower port of the vehicle and detecting a vehicle body correction angle of the virtual vehicle body line with reference to a horizontal plane.

7. The vehicle radar inspection method of claim 6, further comprising, after d), performing e) deriving, by the server, a final mounting error by reflecting the vehicle body correction angle to a mounting error of the radar sensor and determining whether the radar sensor is normally mounted based on the final mounting error.

8. The vehicle radar inspection method of claim 7, wherein e) comprises determining whether the final mounting error is included within a range that can be corrected by the radar sensor, and generating a radar sensor correction value for correction of the final mounting error and transmitting the generated radar sensor correction value to the radar sensor when the final mounting error is included in the range.

9. The vehicle radar inspection method of claim 8, wherein e) comprises entering the radar sensor into a repair process for re-mounting when the final mounting error is not included in the range that can be corrected by the radar sensor.

* * * * *